US006788295B1

(12) United States Patent
Inkster

(10) Patent No.: US 6,788,295 B1
(45) Date of Patent: Sep. 7, 2004

(54) TOUCH PAD USING A NON-ELECTRICAL DEFORMABLE PRESSURE SENSOR

(75) Inventor: Robert D. Inkster, Victoria (CA)

(73) Assignee: Tactex Controls, Inc., British Columbia (CA)

( * ) Notice: Subject to any disclaimer, the term of this patent is extended or adjusted under 35 U.S.C. 154(b) by 0 days.

(21) Appl. No.: 09/979,134

(22) PCT Filed: May 24, 2000

(86) PCT No.: PCT/CA00/00599

§ 371 (c)(1),
(2), (4) Date: Nov. 20, 2001

(87) PCT Pub. No.: WO00/73982

PCT Pub. Date: Dec. 7, 2000

(30) Foreign Application Priority Data

May 26, 1999  (CA) .............................................. 2273113

(51) Int. Cl.[7] .............................. G09G 5/00; G01L 1/24
(52) U.S. Cl. .................... 345/175; 345/173; 178/18.09; 250/227.14; 250/227.16
(58) Field of Search .......................... 178/18.01–18.11, 178/19.01–19.07; 345/173–183; 341/34; 250/227.14, 227.15, 227.16

(56) References Cited

U.S. PATENT DOCUMENTS

| | | | | |
|---|---|---|---|---|
| 3,621,268 A | * | 11/1971 | Friedrich et al. ........ | 250/214.1 |
| 4,198,623 A | * | 4/1980 | Misek et al. ................. | 345/175 |
| 4,484,179 A | * | 11/1984 | Kasday ......................... | 178/18 |
| 4,504,700 A | * | 3/1985 | Kubo et al. ................... | 178/18 |
| 4,593,191 A | | 6/1986 | Alles ............................ | 341/22 |
| 4,609,816 A | | 9/1986 | Severin ................... | 250/227.14 |
| 4,812,833 A | * | 3/1989 | Shimauchi ................. | 178/18 |
| 4,837,430 A | * | 6/1989 | Hasegawa ................... | 250/221 |
| 5,136,156 A | * | 8/1992 | Nounen et al. ............. | 250/221 |
| 5,266,949 A | * | 11/1993 | Rossi .......................... | 341/22 |
| 5,818,037 A | * | 10/1998 | Redford et al. ............. | 250/229 |
| 5,887,995 A | | 3/1999 | Holehan ................. | 250/227.14 |

FOREIGN PATENT DOCUMENTS

| | | |
|---|---|---|
| EP | 0 672 981 A1 | 6/1995 |
| WO | WO 98/30967 | 12/1997 |
| WO | WO 99/04234 | 7/1998 |

* cited by examiner

Primary Examiner—Lun-Yi Lao
(74) Attorney, Agent, or Firm—McFadden, Fincham

(57) ABSTRACT

A touch pad for controlling electronic equipment includes a deformable touch surface and a compressible pad body in contact with the touch surface. The compressible body is formed from a material which scatters or diffuses light within the material. Multiple sources of light or other wave energy are directed into the interior of the substrate to form multiple illuminated cells inside the pad body. Each illuminated cell forms an integrated cavity within the pad body. A detector in communication with the compressible material detects light intensity within the integrated cavity. A processor receives signals from the detector and converts the signals into useable information relating to the position of regions of compression of the pad.

8 Claims, 3 Drawing Sheets

TOUCH PAD USING A NON-ELECTRICAL DEFORMABLE PRESSURE SENSOR

FIELD OF THE INVENTION

The present invention relates to touch pads for controlling electronic equipment. More particularly the invention relates to a deformable pressure sensor for detecting the position of an indentor, mediated by changes in light intensity within the interior of a touch pad caused by local application of pressure, to control electronic equipment.

BACKGROUND OF THE PRIOR ART

So called "touch pads" are commonly used to control electronic equipment. A well-known application of this device is for control of a computer, namely the familiar "touch pad" associated with many laptop computers. Touch pads can also be used to control other types of equipment, and they have the potential within many fields of application to provide a simple, highly accurate and easy to use control means.

Touch pads consist of devices which detect the position of an "indentor" and use this information to effect some form of control over an electronic device. The indentor can be a user's finger or fingers or another part of the user's body, or a tool like a pen or stylus which is wielded by the user. A touch pad may respond to one or more indentors. A touch pad can also respond both to positional information and the amount of pressure exerted on the pad.

Virtually all touch pads now in use rely in one respect or other on electrical circuitry within the pad to convert a user's touch into an electronic signal. Some touch pads, like those used on many laptop computers, are based on sensing of the electrical properties of the indentor, such as its capacitance. These pads are well suited to locating the position of a finger, which is used to control a pointer on the computer display. They typically do not register the amount of pressure exerted by a finger, nor do they respond to an electrically inert indentor such as a pencil.

Other touch pads are based upon force sensitive resistor technology. This technique allows the detection of the amount of pressure exerted by an indentor, as well as the position of the indentor on the surface of the pad. The indentor may comprise the user's finger, or any other electrically inert object. Touch pads based on this technology are becoming widely used as computer control devices. Yet other touch pads are commonly called graphics tablets. These require specialized indentors, which work in conjunction with the tablets. With some tablets, the indentors emit acoustic energy which is timed by the tablet to compute the location of the indentor. Others use an inductive principle to locate the position of the indentor, sometimes the quantum of pressure and even its tilt with respect to the horizontal plane.

There is a need for touch pads that do not require specialized indentors; such indentors can be expensive and not as convenient or expressive as fingers. There is a need for touch pads which can simultaneously locate several indentors—this would allow for the capture of gestures made by several fingers, and the use of those gestures to control equipment in a complex manner. There is also the need for touch pads that are relatively inexpensive to produce, and which do not rely on electrical sensing systems to measure the location of indentors.

Humans typically use several fingers simultaneously to control various tools, musical instruments and toys. Computer applications such as control systems for machines, drawing programs, musical synthesizers and video games would benefit from the use of expressive control means which allow the input of complex multi-touch gestures. Touch pads to capture such gestures could be produced using electrical sensing techniques. However, the multiplicity of individual touch sensor elements that would be required would lead to an expensive device, and the low level electrical signals from such sensors are susceptible to electrical noise at a level which could drown the usable signal.

It is herein proposed to provide a touch pad that relies on a pressure sensor of the type described within PCT publication No. WO 99/04234. This type of pressure sensor relies on a deformable integrating optical cavity (i.e. one capable of scattering and/or diffusing light) formed within a deformable material such as polymeric foam for detecting a pressure applied to the material. Light or other wave energy is beamed into the material from a source, to form an optical cavity with the material, consisting of a region of fully scattered light from the source. A detector within or adjacent to the optical cavity and spaced apart from the source detects intensity of the scattered and diffused light within the compressible material. The sensor operates on the principle whereby deformation of the material decreases the effective size of the integrating optical cavity and thereby increases the light intensity in the region around the source. Thus, in the case where the emitter and detector are adjacent to each other or in the vicinity of each other, they will both reside within the same optical cavity, the boundaries of which are established by the illuminated zone created by the light source. Light within the cavity is fully integrated (i.e. scattered) by the scattering centers evenly disbursed within the sensor body. That is, light received at any single point within the optical cavity emanates from all directions generally evenly. An increase in pressure on the material and consequent deformation in the region of the light source results in a consequent increase in the intensity of light within the optical cavity and detected by the detector. The signal corresponding to the intensity detected by the detector is transmitted to a processing unit which in turn quantifies the pressure experienced by the material.

Throughout the present patent specification, it will be understood that the term "light" embraces wave energy of any suitable form, including electromagnetic radiation in the non-visible spectra.

In one version of a prior art pressure sensor of this type, the light emitter and detector each comprise multiple fiber optic strands leading to and from a central controller. With this arrangement, multiple detectors and emitters can be spaced throughout the sensor body in such a way that they can detect the pressures from multiple indentors. For example, a sheet of deformable material may be underlain with a planar array of light emitter/detector pairs, which detect and localize deformation of a particular portion of the sheet.

This principle is particularly advantageous for use with touch pads, since it allows the provision of a plurality of spaced-apart light sensors within the pad body material, with the spacing and the material itself optimized to detect the range of pressures expected from particular types of indentors.

It is an object of this invention to provide a touch pad which addresses the above requirement. It is also an object of this invention, in order to minimize cost and complexity, to provide a light-based sensor which achieves a highly sensitive, multi-indentor detectability with a minimum number of light emitters and detectors.

SUMMARY OF THE INVENTION

The invention comprises in one aspect a touch pad for controlling an electronic apparatus comprising a flat, resilient pad having means to detect the position of an indentor bearing down on the pad and means to convert localized pressure into an electronic signal, characterized by:

the pad body comprising a light-translucent compressible material having light scattering centers evenly disbursed therein and capable of forming within the interior of the pad body an integrated optical cavity defined by a region of fully scattered or diffused light;

multiple spaced apart light emitter and detector pairs in communication with the pad body, positioned to form within the pad body an array of adjacent cells, each cell comprising an optical integrating cavity whereby localized compression of the pad by one or more indentors increases the light intensity within one or more corresponding cells;

signal processing means for receiving signals from the detectors and converting the signals into useable information relating to the position of regions of compression within the pad caused by indentors, for control of an electronic apparatus by moving the indentor or indentors on the pad body.

Conveniently, the compressible material may comprise an open or closed cell foam, and the light emitters and receivers may comprise fiber optic cables, associated with a light source and detector respectively.

In a further aspect, a surface membrane covers the upper face of the pad body. The mechanical properties of the surface membrane permits pressure exerted by an indentor to be spread horizontally so as to cause the subsequent deformation of the compressible material to be spread horizontally and to be detectable by receivers located at some horizontal distance from the indentor. The appropriate selection of a surface membrane material also determines the minimum force which will cause a compression in the pad body which is detectable by one or more receivers, and the force of shortest duration which is so detectable. For example, the mechanical and surface properties of the surface membrane may be varied locally by the application of paints or other surface coating, or by the application of other surface layers which change locally the horizontal communication of compressive forces in the compressible material, the minimum detectable force and the force of shortest duration which may be detected by one or more receivers.

The surface membrane may comprise an array of dimples, each overlying an individual cell and facing convexly inwardly. This arrangement enhances the sensitivity of the device. This type of membrane conveniently comprises a thermoformed plastic sheet. Alternatively the membrane may be flat.

In a further aspect, a reflective material may be positioned beneath the source and detector, thereby increasing the efficiency of the device.

In a further aspect, the pad body may be supported by a rigid base. In this case, the vertical travel of the indentor, and thus the maximum force which can be detected, is constrained. Alternatively, the pad body may have no base, or may be attached to a comparatively flexible base. With a flexible base, the deformation of the pad body results in both compression and bending and flexing.

In a further aspect, a multiplexed array of light emitters and receivers comprise fiber optic strands associated with multiple sources and receivers such as light emitting diodes (LEDs) and photodiodes. Conveniently, the array may be arranged such that individual light sources and receivers are each associated with multiple fibre optic strands. With a multiplexing arrangement of this type, multiple fiber optic strands may be interfaced to a single emitter such as an LED. The receivers comprise multiple sets of fibre optic lines, each set interfaced to an individual receiver such as a photodiode. The groups of emitter and receiver lines form a matrix whereby within any given pair of cells within the pad, the emitter strands associated with the two cells are linked to different light sources and the receiver strands associated with each of the two cells are linked to different detectors within the processing means. Thus, when a first LED is activated, the response from a corresponding photodiode is a measure of the pressure detected within a given cell. When a second LED is activated, a response from the same photodiode is a measure of the pressure detected by a second cell. The above arrangement may comprise two receiver fibres linked to each detector, thus permitting a highly effective touch pad sensor which reduces by half the number of photodetectors required within the processing means, and which requires only two light sources. The use of additional light sources permits a further reduction in the number of detectors. By providing a rapidly sequentially switching pattern within LED's so connected, and detecting the resulting responses from the photodiodes, a large number of cells may be monitored with a relatively small number of photodetectors.

In a further aspect, the receiver fiber optic strands may be attached to linear or area photodiode detectors, thereby further reducing the number of photometers required to monitor a large array of pressure sensors, and hence a reduction in the cost and complexity of the touch pad.

In a further aspect, the receivers may be connected to a signal processor having appropriate analogue and/or digital circuitry so that the response from each receiver may be measured, corrected for error effects, and supplied in a format suitable to control a computer or other machine. The signal processing may comprise comparing the responses from several pressures sensors which have been activated in varying amounts by a single indentor. The relative responses may be used to calculate an accurate horizontal position of the indentor, as well as the pressure exerted by that indentor. Calculations for multiple indentors can also be done in this fashion.

In a further aspect, the cellular array may be non-uniform. For example, the cells may be set more closely together in the left to right dimension than the top to bottom dimension of the pad body. This permits the pad body to have good resolution of oblong indentors such as a human finger, while permitting a reduced number of cells.

In a further aspect, the invention comprises a method for providing control signals to a computer or other electronic apparatus via a touch pad, characterized by:

providing a touch pad comprising a light-translucent, compressible pad body which is capable of forming within its interior an integrated optical cavity for fully scattering or diffusing wave energy such as light, multiple light emitter and detector pairs in communication with the pad body and positioned to form an array of adjacent cells within the pad body, each cell defined by an optical cavity, the array comprising at least substantially all pad body, and signal processing means to receive signals from the detectors;

transmitting light via the emitters into the pad body, thereby forming a cellular array of individual optical cavities each having an intensity of fully scattered light within the cavity;

contacting the pad body with one or more depressors or indentors, thereby compressing one or more corresponding cells within the pad body;

detecting the locality of the compressed region of the pad body, by measuring the corresponding increase in light intensity within one or more of the cells by the detectors;

transmitting the resulting information from the detectors to the signal processing means;

converting the information from the detectors, to provide electronic control signals in a form useable to the equipment being controlled thereby; and transmitting the resulting control information to the equipment, thereby controlling the equipment.

In a further aspect, the invention comprises a combination of the apparatus described above, and an article of equipment or a computer controlled thereby.

DETAILED DESCRIPTION OF THE PREFERRED EMBODIMENTS

Figure 1:
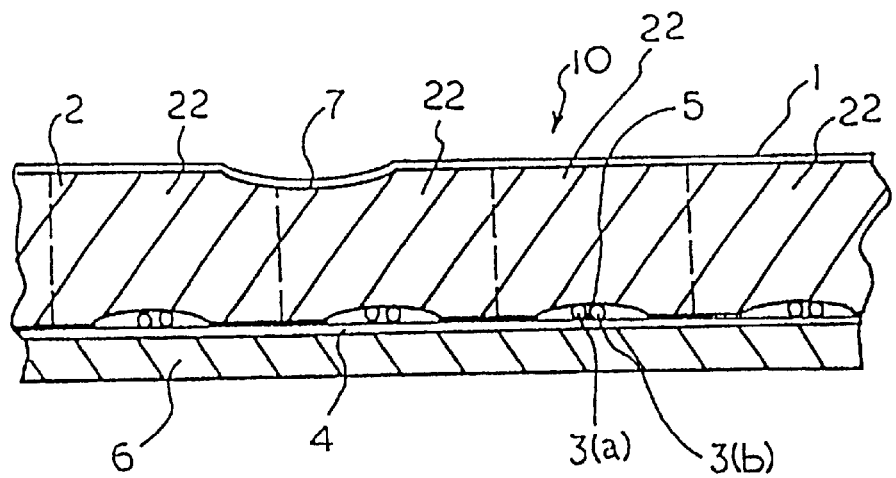
FIG. 1 is schematic side elevational view of an embodiment of the present invention.

With reference to FIG. 1, a touch pad 10 according to one preferred embodiment is herein described. A pad body 2 comprising a compressible material is shown mounted on a rigid base 6. The pad body 2 is formed from a light translucent material such as closed or open cell foam material. A surface membrane 1 comprises the uppermost layer of the pad. The membrane is composed of a flexible, durable material such as a fabric or polymeric sheet. The degree of flexibility required of the membrane will depend on the resiliency of the underlying layer 2, and the desired tactile qualities of the device. This membrane 1 may be attached to the pad body with an adhesive, or the compressible material of the pad body may be manufactured in conjunction with the membrane and fused thereto. The region 7 within the pad body indicates a zone of local compression of the pad caused by an indentor such as a user's finger. The bottom surface of the pad body 2 is fastened to the base 6 by a layer of double-sided adhesive 4. Alternatively, the pad body may be manufactured in conjunction with the other elements of the pad. Multiple pairs of fiber optic strands 3(a) and 3(b) (shown in cross section) are mounted between the base 6 and the layer 2. A thin piece of reflective material such as aluminized Mylar™ is shown beneath the fiber pairs (see FIG. 2). The optic pairs 3 each comprise an emitter strand 3(a) and a receiver strand 3(b). The paired strands 3(a) and 3(b) are positioned either in side by side contact or in close proximity with each other, in order to encompass both strands within a common optical cavity formed by the light source, as will be discussed below.

The membrane 1 may comprise either a flat layer or a dimpled sheet comprising a thermoformed plastic layer. If dimpled, the dimples each overlie an individual cell. This arrangement enhances the sensitivity of the touch pad.

Figure 3A:
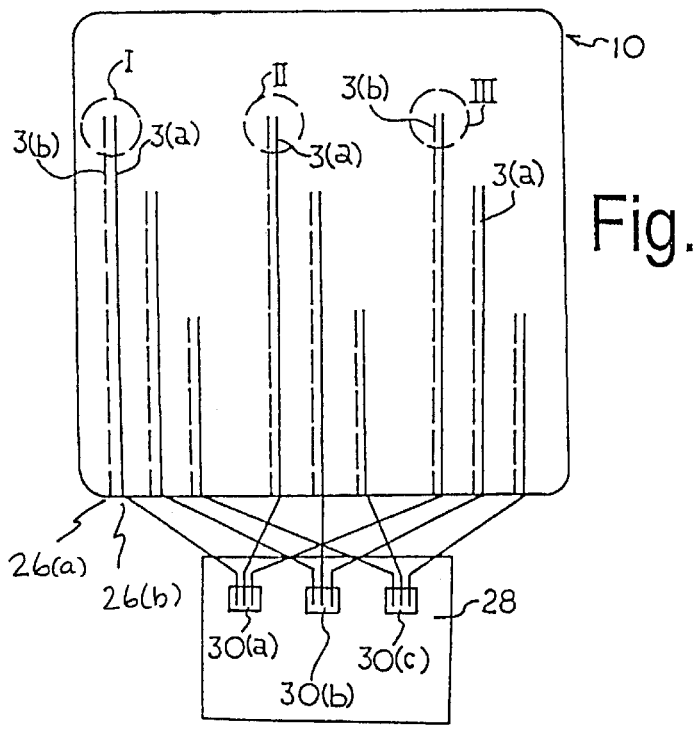
FIG. 3(a) is a plan view illustrating a first optical fiber layout, showing the linkages associated with the light emitters.
Figure 3B:
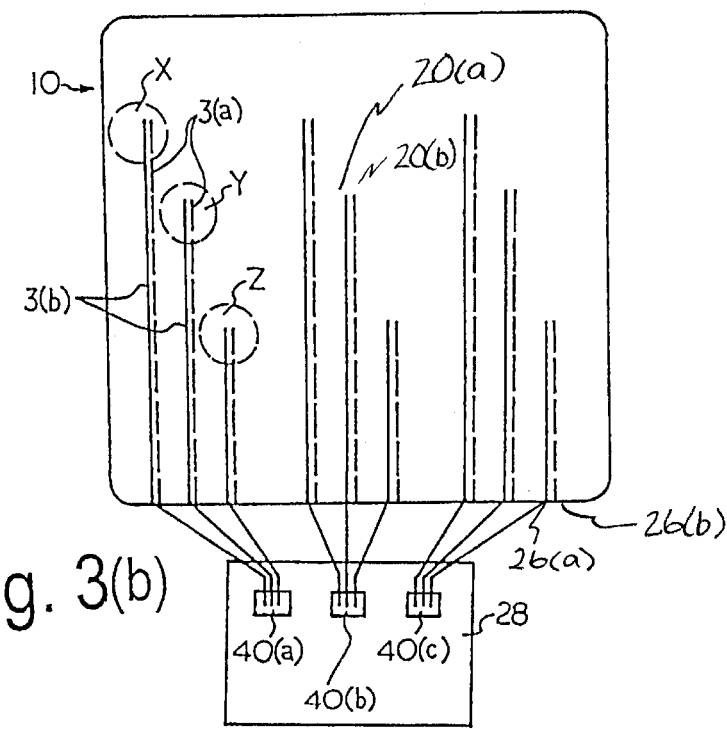
FIG. 3(b) is a view of an embodiment of the invention as in FIG. 3(a), showing linkages associated with the light receptors.
Figure 4:
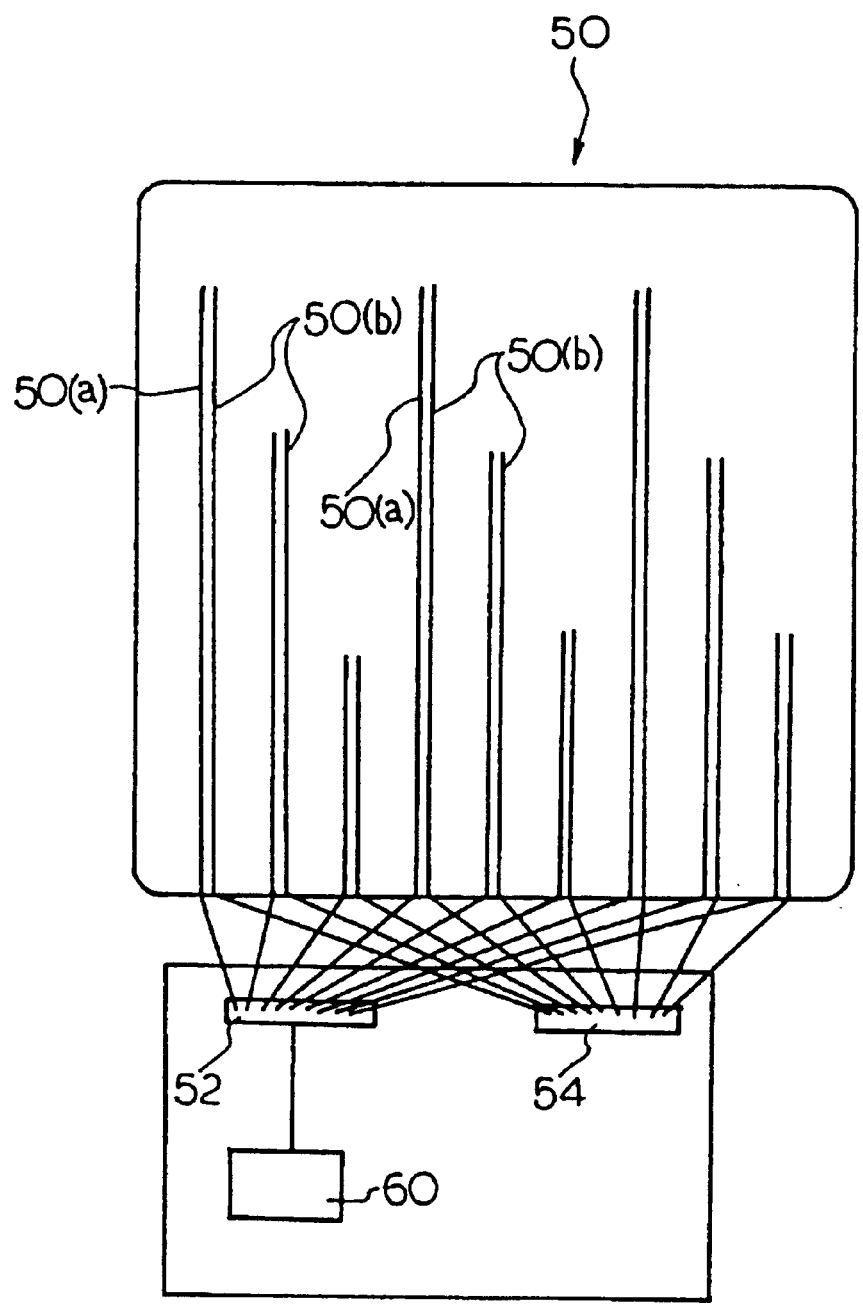
FIG. 4 is a plan view of a further embodiment of the invention illustrating an alternative optical fiber layout.

The optical fiber pairs 3 terminate at various positions relative to the pad 10, and collectively form an array of emitters and receivers 3(a) and 3(b) which are generally dispersed around the pad as seen in FIGS. 3 and 4. It will be noted that for simplicity, the figures show a reduced number of fiber optic lines than would be required for full coverage. The fiber optic pairs each terminate at a first end 20 directly beneath the pad body 2. The first ends 20(a) and (b) form respectively light emitters and receivers. The light emitters each illuminate a region or cell within the pad body 2, which effectively forms an optical cavity 22. The receivers 29(b) are positioned in close proximity to their corresponding sources (a), within the cell 22.

The array of fiber optic pair ends 20 is arranged such that the cells 22 form a adjacent array.

The second opposed ends 26(a) and (b) of the fiber optic pair terminate within a central signal processing unit 28. As will be described below, multiple light sources within the CPU 28 are associated with the terminals 28(a) of the emitters 3(a) of the fiber optic pairs 3. The terminals 26(b) of the receivers 3(b) are associated with the processing means (not shown) within the CPU which converts the light intensity level received by the respective receivers 20(b) into useable positional information concerning the location of a compressed region or regions of the pad 10.

Figure 2:
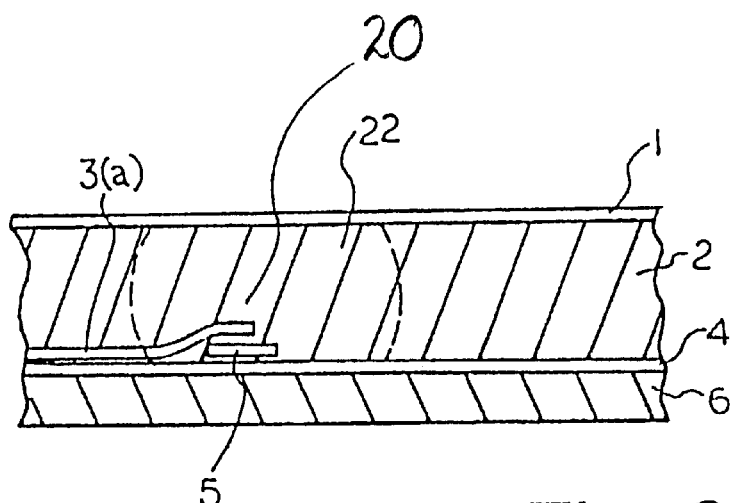
FIG. 2 is a second schematic elevational view of an embodiment of the invention, transverse to the first elevation.

FIG. 2 shows a sectional view of the pad. The surface membrane 1, compressible pad body 2, and adhesive layer 4 are shown. The fiber pair 3 is now seen from the side. It can be seen terminating above a strip of reflective material 5, which serves to locally increase the intensity of light with the layer 2, thus effectively increasing the size of the optical cavity formed around the termination 20(a).

FIGS. 3(a) and 3(b) show the first embodiment of a pad 10 in plan view, with the location of fiber pairs illustrated as required for the multiplex operation of the invention. With this arrangement, multiple indentations of the pad may be detected, with the light source and detectors being fewer than the number of fiber optic pairs 3. Fibers 3(a) are emitter fibers, connected to a light source 30 within the CPU 28. It can be seen that a total of 3 emitter fibers are connected to the same light source. Fibers 3(b) are receiver fibers which are shown in dotted lines to simplify the drawing. FIG. 3(b) shows the same pad 10 with fibers 3(b) shown in solid lines, while emitter fibers 3(a) are shown in dotted lines. A bundle of three receiver fibers is connected to a detector 40. This pad contains nine fiber pairs, three light sources (30(a), (b) and (c)) and three detectors (40(a), (b) and (c)) and is referred to as a three by three array. Larger and more complex arrays can be constructed using the same approach.

The embodiment illustrated within FIGS. 3(a) and 3(b) comprises a touch-pad which is capable of detecting multiple regions of compression, formed by 'multiple depressors'. This is accomplished by providing multiple receivers, which are capable of simultaneously receiving light intensity levels within multiple optical cavities, and transmitting the information for processing concerning same.

The pad having the multiplexed arrangement described herein may have within the CPU a number of detectors 40 which is fewer than the total number of light receptor fibre ends 20(b). Within the CPU there is provided a sequential switching means, to rapidly and in sequence provide pulses of light emanating from the light sources 30(a) through (c), respectively, thereby rapidly and sequentially illuminating the optical cavities associated with the corresponding fiber optic transmitters 3(*a*). The sequential switching operation is controlled by a switching controller, which is also linked to the multiple detectors 40(*a*) through (*c*), respectively. It will thus be seen that detection of a signal within detector 40(*a*), for example, would result from depression of a region of the pad corresponding with any one of the three specific locations within the pad. Localization of the depressed region, amongst the three alternatives, is determined by reference to the sequential elimination sequence. Thus, for example, the pad regions associated with three transmit fibers associated with light source 30(*a*), are identified by numbers I, II and III. The pad regions associated with detector 40(*a*), are identified by x, y and z, in FIG. 3(*b*). It will be seen that when light source 3(*a*) is illuminated, compression of region x may be detected in I, II and III. However, when light source 30(*a*) is switched off, compression of regions x may not be detected, and compression may only be detected within the regions surrounding emitters y and z upon switching on of light source 30(*b*) and 30(*c*), respectively. The sequential switching operation is performed very rapidly, in order to permit the arrangement to detect relatively brief periods of depression.

FIG. 4 illustrates a further embodiment of the invention, which is not multiplexed. That is, only a single light source is provided, with all of the fiber optic transmitter lines being linked to the common source. The fibre optic detector fibres each terminate in an individual photodetector, which is part of an array of photodetectors.

FIG. 4 shows a pad 50 comprising a three by three array with fiber pairs arranged appropriately for a non-multiplexed operation. Here an array of receiver fibers 50(*a*) are connected to an array of photodetectors 52, with the fibers each being interfaced to a corresponding pixel in the array, such that the signals from individual fibers can be discriminated by the pixels in the array. The emitter fibers 50(*b*) are all interfaced to a common light source such as an LED 54. The photodetector array is linked to a central signal processing unit 60, in much the same manner as in the first embodiment, to process the information received by the array and convert same into useable control information.

What is claimed is:

1. A touch pad input device for actively controlling the operation of an electronic apparatus by hand movement of an operator, comprising:

a flat, resilient pad body having means to detect the position of at least one indentor bearing down on the pad body controlled by hand movement of an operator and means to convert such localized pressure into an electronic control signal, characterized by:

said pad body comprising a resilient light translucent material having light scattering centers generally uniformly distributed therein;

an array of light emitter and receiver pairs positioned adjacent to and terminating in a staggered lengthwise relationship relative to the other and being in operative communication with said pad body, said emitters each for transmitting light within said pad body thereby forming an optical cavity defined by a region of fully scattered light within said pad body, said receivers each for receiving light within said optical cavity for detecting the intensity of said scattered light, said emitter and receiver pairs forming an array of adjacent cells each defined by an optical cavity within said pad body, each cell being in communication with one of said emitters and receivers, wherein localized compression of said pad by the finger of a user results in an increase in scattered light intensity within at least one of said cells to detect pressure from the finger to determine the position of the finger on said pad; and signal processing means for receiving light intensity information from said receivers, translating said information into a signal indicative of the location at which said pad is compressed, and generating an electronic signal for control of the operation of an electronic apparatus responsive to the position of said at least one indentor on said pad body.

2. The touch pad input device of claim 1, wherein said touch pad further includes a surface membrane associated with said pad body, said membrane having dimples facing convexly towards and overlying said optical cavities and adapted to deform said optical cavities upon compression of said surface membrane against said pad body.

3. The touch pad input device of claim 2, wherein said optical cavities intensify light illuminated from said light emitters for detection by said means to detect.

4. The touch pad input device of claim 3, wherein said array is a planar configuration and said optical cavities are of a higher concentration of optical cavities along a first horizontal axis than along a second horizontal axis perpendicular to said first axis.

5. The touch pad input device of claim 4, wherein said signal processing means further includes a processing means for receiving light intensity information from said means to detect and translating said light intensity information into a signal indicative of a specified pad region and pressure applied to said specified pad region.

6. The touch pad input device of claim 5, wherein said light intensity is received sequentially by said receivers and said processing means further includes means for resolving said light received sequentially by said light receivers from said light emitters.

7. The touch pad input device of claim 6, wherein said electrical device is responsive to said signal which specifies said pad region and said pressure applied to said specified pad regions.

8. The touch pad input device of claim 7, wherein the total number of means to detect are fewer than the total number of said light receivers.

* * * * *